ALONZO T. BOONE, H A. BOONE

MIXED PAINT.

SPECIFICATION forming part of Letters Patent No. 342,174, dated May 18, 1886.

Application filed January 14, 1885. Serial No. 152,855. (Specimens.)

*To all whom it may concern:*

Be it known that I, ALONZO T. BOONE, a citizen of the United States, residing at Chicago, in the county of Cook and State of Illinois, have invented a certain new and Improved Coating Compound; and I hereby declare the following to be a full, clear, and exact description of the same.

My invention relates to the class of compounds usually applied through the medium of a brush to surfaces, to provide upon the latter coats for the purpose of affording to them an attractive appearance, the operation of applying such compounds being expressed by the term "painting," though the present compound is not, as will be understood from the description hereinafter contained, necessarily a "paint," since it need not contain a pigment, which forms an ingredient of paint, as this term is commonly understood.

"Tuno" is a name applied by the natives of Honduras, Central America, to a tree, to which the botanical name "Isonandrah" has been given. The tree, which grows in great profusion, is thought to be indigenous to Central America, and belongs to the same family as the rubber and gutta-percha trees, the leaves, bark, and size of the tree being similar. Analysis has shown that the sap obtained from the tuno-tree contains twenty per cent. of the properties contained in caoutchouc, forty per cent. of those contained in gutta-percha, and forty per cent. of rosin and similar substances. The sap is obtained by the inhabitants from incisions made in the trees, and soon hardens to a gum on exposure to the atmosphere. The most striking apparent differences between this substance and caoutchouc and gutta-percha appear to consist in the facts that it does not, like gutta-percha, become brittle with age and exposure to the atmosphere and moisture, but acquires increased tenacity, and that it does not, like rubber, rot when exposed to moisture, the latter of which facts is made evident by the discovery of household utensils in the forms of drinking-vessels, &c, in good condition, having been unearthed from various depths in the ground, wherein they had, doubtless, been buried for ages. The substance is not tough and unyielding like gutta-percha, nor elastic like rubber. It may readily be cut by a hydrocarbon oil or turpentine, and perhaps by other substances, and is impervious to moisture or air when applied as a coating and hardened. In this last-named form of its application it affords a glossy surface, like varnish, and, owing to the resistance which it affords for any length of time to the action of water, damp, and all the causes which produce fermentation and decay, has a preservative effect on wood, prevents corrosion of iron and flaking of stone, and preserves brick and prevents the oozing to the surface of the latter of alkali, which may be contained in the clay of which they are formed.

It is my object to provide a coating compound which shall contain, as an ingredient, the substance "tuno-gum," whereby the desirable properties above mentioned of this gum may be employed in a very useful form.

To this end my invention consists in a coating compound composed of tuno-gum and a vehicle solvent.

My invention further consists in a coating compound composed of tuno-gum dissolved in a vehicle solvent, and rosin; and it further consists in a coating compound composed of dissolved tuno-gum, rosin, oil, and coloring-matter.

To form my improved coating compound, I prefer to employ, in the proportions hereinafter named, all of the following ingredients: tuno-gum, one-fourth pound; benzine or naphtha, one quart; linseed or cotton-seed oil, one gill; rosin, one pound; copal, one-eighth pound, to produce a varnish, or pigment to produce a paint of any desired color, and in proper proportions to provide the desired depth of color.

The tuno-gum in the compound effects, in addition to its other properties, the precise purpose of linseed-oil in paint, and affords a better product than one in which linseed-oil is employed, at one-fourth the cost of the latter, and produces a desirable gloss upon the surface to which it is applied.

Although benzine and naphtha are named as media, either one of which may be employed to cut the tuno-gum, any hydrocarbon oil or turpentine will answer the purpose, and any suitable resinous gum may be employed as a base, instead of rosin.

What I claim as new, and desire to secure by Letters Patent, is—

1. A coating compound composed of tuno-gum and benzine or naphtha, or an equivalent solvent, substantially as described.

2. A coating compound composed of tuno-gum, benzine or naphtha, or an equivalent solvent, and rosin or its equivalent, substantially as described.

3. A coating compound composed of dissolved tuno-gum, rosin, oil, and coloring-matter, in substantially the proportions named.

ALONZO T. BOONE.

In presence of—
A. C. CALKINS,
MASON BROSS.